(12) United States Patent
Priebe

(10) Patent No.: US 8,140,528 B2
(45) Date of Patent: Mar. 20, 2012

(54) METHOD AND SYSTEM FOR MANAGING DISCOURSE IN A VIRTUAL COMMUNITY

(75) Inventor: Lancelot Darren Priebe, Kelowna (CA)

(73) Assignee: Disney Enterprises, Inc., Burbank, CA (US)

( * ) Notice: Subject to any disclaimer, the term of this patent is extended or adjusted under 35 U.S.C. 154(b) by 348 days.

(21) Appl. No.: 12/012,873

(22) Filed: Feb. 6, 2008

(65) Prior Publication Data
US 2009/0198778 A1     Aug. 6, 2009

(51) Int. Cl.
*G06F 15/16* (2006.01)
*G06F 17/30* (2006.01)
(52) U.S. Cl. ............... 707/734; 707/922; 709/206
(58) Field of Classification Search .......... 707/734, 707/922; 709/204, 206
See application file for complete search history.

(56) References Cited

U.S. PATENT DOCUMENTS

| | | | |
|---|---|---|---|
| 5,796,948 A * | 8/1998 | Cohen | 709/206 |
| 6,339,784 B1 * | 1/2002 | Morris et al. | 709/204 |
| 6,507,866 B1 * | 1/2003 | Barchi | 709/207 |
| 6,571,234 B1 * | 5/2003 | Knight et al. | 1/1 |
| 6,778,941 B1 * | 8/2004 | Worrell et al. | 702/176 |
| 7,428,580 B2 * | 9/2008 | Hullfish et al. | 709/207 |
| 2003/0009495 A1 * | 1/2003 | Adjaoute | 707/501.1 |
| 2004/0001090 A1 * | 1/2004 | Brown et al. | 345/752 |
| 2004/0111479 A1 * | 6/2004 | Borden et al. | 709/206 |
| 2005/0102366 A1 * | 5/2005 | Kirsch | 709/207 |
| 2006/0259543 A1 * | 11/2006 | Tindall | 709/203 |
| 2007/0067436 A1 | 3/2007 | Vaughn | |
| 2007/0143403 A1 * | 6/2007 | Ulmer et al. | 709/204 |

FOREIGN PATENT DOCUMENTS

| | | |
|---|---|---|
| JP | 2003-296236 A | 10/2003 |
| JP | 2006-172231 A | 6/2006 |
| KR | 2001-0070796 | 7/2001 |
| WO | WO99/46683 | 9/1999 |
| WO | WO 2006/094335 | 9/2006 |

* cited by examiner

*Primary Examiner* — James Trujillo
*Assistant Examiner* — Jorge A Casanova
(74) *Attorney, Agent, or Firm* — Farjami & Farjami LLP

(57) ABSTRACT

There is provided a method of managing discourse in a virtual community. The method comprises receiving a message from a virtual community user, the message being addressed to one or more recipient users of the virtual community; examining the message to identify any of a plurality of key expressions associated with virtual community forbidden communications; editing the message in response to identifying a forbidden key expression of the plurality of key expressions; determining a corrective prompt corresponding to the identified key expression; and issuing the corrective prompt to the virtual community user for managing discourse in the virtual community.

14 Claims, 3 Drawing Sheets

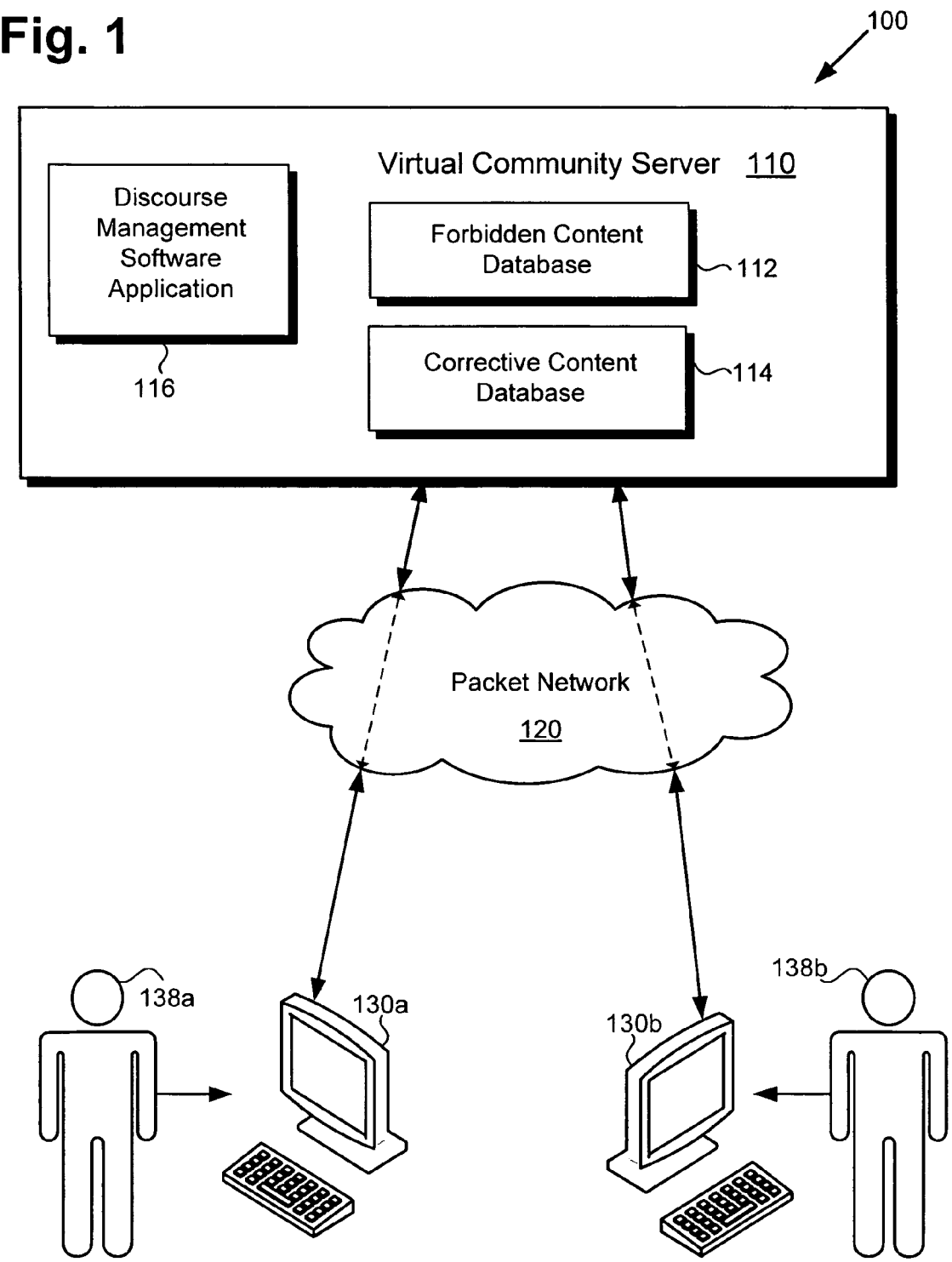

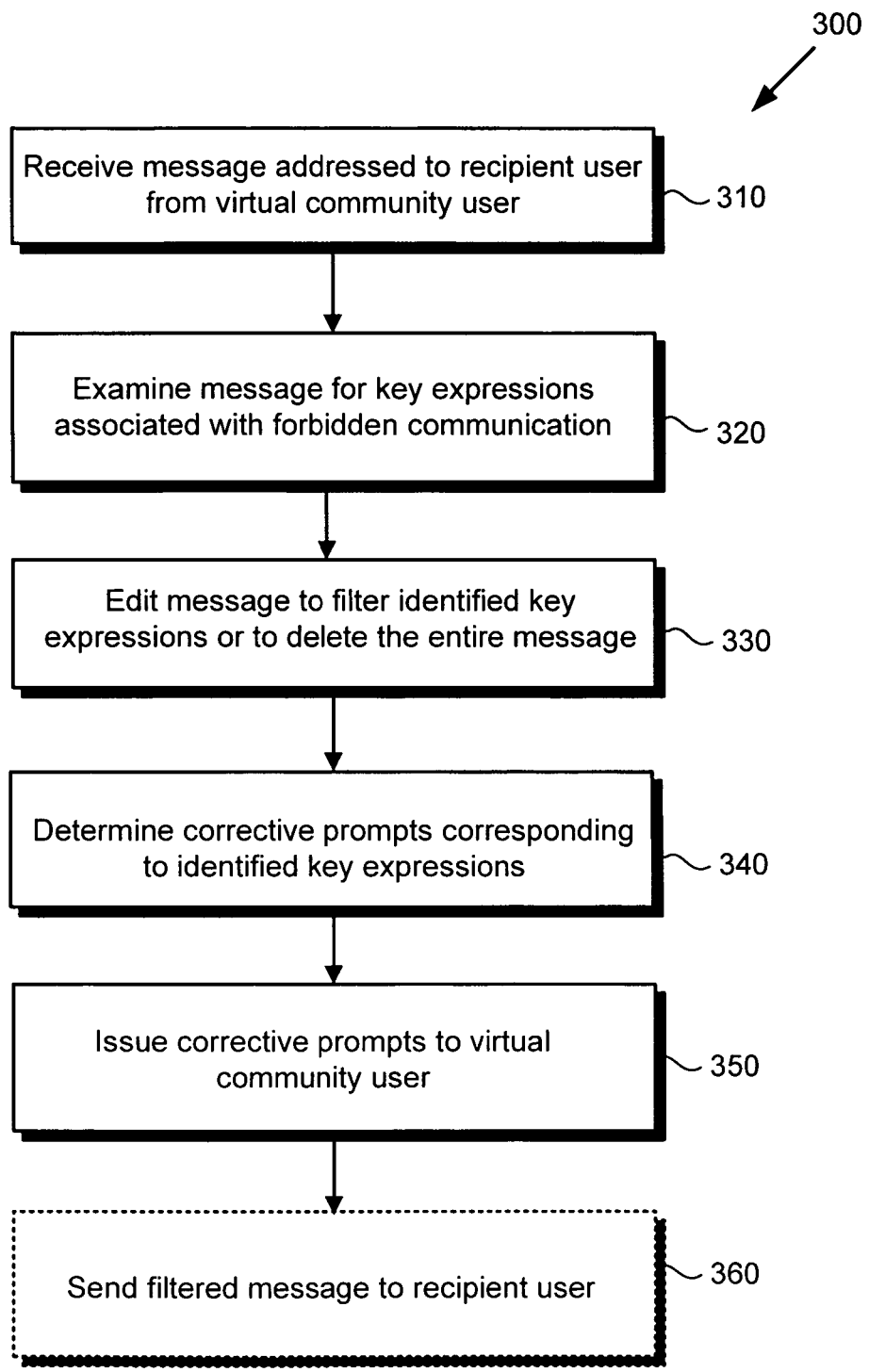

METHOD AND SYSTEM FOR MANAGING DISCOURSE IN A VIRTUAL COMMUNITY

BACKGROUND OF THE INVENTION

1. Field of the Invention

The present invention relates generally to user communication. More particularly, the present invention relates to computer-mediated user communication.

2. Background Art

The rapid growth in the use of computers to mediate virtual interactions amongst users is beginning to redefine the social importance of these systems. Once regarded as isolating, albeit useful, information management and commercial tools, computers are increasingly valued as gateways to virtual socialization venues. The popularity of websites such as MySpace and Facebook demonstrate the growing relevance of Internet-based virtual communities, for example, as alternatives for social networking. As those popular Internet resources show, changes in the demographics of computer users to include a younger, more diverse population comfortable with technology, has led to computer-mediated virtual communities becoming true alternatives to real world communities for young people seeking to form casual social relationships.

The proliferation of socialization opportunities arising from the use of computers to access virtual communities has many potential benefits. Among those may be counted the benefits to young computer users from the broadening and tolerance engendering exposure to socialization partners of different ethnicities, as well as to socialization partners residing in geographically far removed locations, or those living under very different economic or political conditions. There can also be unpleasant or undesirable consequences resulting from socialization in a virtual forum, however, due in part to the remoteness of the interaction. Distance, as well as perhaps divergence in social mores, may lead to misunderstanding, insult, or simply uncivil expression of ideas. Unfortunately, those consequences are especially undesirable for the young and perhaps socially inexperienced computer users most likely to utilize virtual social venues.

A conventional approach to controlling communications in a virtual community has been to utilize language filters to identify and redact disallowed words. Conventionally, if a message contains words identified as offensive or unacceptable, its content is altered either by deletion of the inappropriate words, or their replacement by ellipses or other placeholders. While perhaps effective in imposing a crude level of censorship on communications exchanged in a virtual community, conventional approaches makes little or no attempt to improve the overall quality of discourse occurring there. This deficiency in conventional approaches to controlling communications in a virtual community is particularly unfortunate, because it causes an opportunity to educate younger users about good communication protocol to be missed. Moreover, because many of those same young users consider virtual socialization to be qualitatively indistinguishable from real world social interaction, failing to foster positive communication habits in the virtual realm also misses the socially useful opportunity to encourage civility in other aspects of the lives of young computer users.

Accordingly, there is a need to overcome the drawbacks and deficiencies in the art by providing a solution for managing communication amongst users of a virtual community that protects those users from inappropriate communications while also shaping and elevating the level of discourse occurring there.

SUMMARY OF THE INVENTION

There are provided methods and systems for managing discourse in a virtual community, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 shows a diagram of an exemplary system for managing discourse in a virtual community, according to one embodiment of the present invention;

FIG. 3 is a flowchart presenting a method of managing discourse in a virtual community, according to one embodiment of the present invention.

DETAILED DESCRIPTION OF THE INVENTION

Figure 2A:
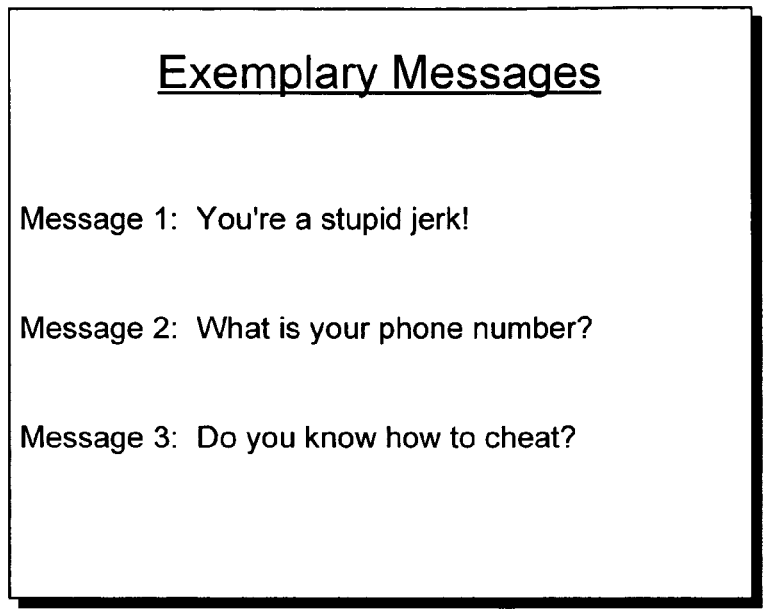
FIG. 2A shows a visual frame corresponding to a screen display of exemplary messages containing key expressions associated with virtual community forbidden communications, according to one embodiment of the present invention.

The present application is directed to a method and system for managing discourse in a virtual community. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 shows a diagram of exemplary system 100 for managing discourse in a virtual community, according to one embodiment of the present invention. In the embodiment of FIG. 1, system 100 comprises virtual community server 110 including forbidden content database 112, corrective content database 114, and discourse management software application 116. Also shown in FIG. 1 are packet network 120, client computers 130a and 130b, and users 138a and 138b.

Users 138a and 138b may be users utilizing virtual community server 110 to send messages to other users of the virtual community, or they may be recipient users receiving messages mediated by virtual community server 110. According to the embodiment of FIG. 1, users 138a and 138b may utilize respective client computers 130a and 130b, and packet network 120, to separately access discourse management software application 116, forbidden content database 112, and corrective content database 114, located on virtual community server 110. Discourse management software application 116 can then by utilized to manage communications in the virtual community supported by virtual community server 110.

Forbidden content database 112, stored on virtual community server 110, may include a plurality of key expressions associated with virtual community forbidden communications. For example, a plurality of key expressions comprising individual words, word combinations, and/or phrases may be utilized as a reference database by discourse management software application 116, when examining a message for forbidden communications, such as insults, slurs, salacious comments, or the like. Corrective content database 114, also stored on community server 110, may include a plurality of corrective prompts designed to instruct a user regarding rules of discourse in the virtual community, or guide the user to allowed alternatives to some of the plurality key expressions, for use in future communications.

Discourse management software application 116 is configured to edit the message received from virtual community user 138a or 138b communicating through client computers 130a or 130b, respectively, by deleting the entire message or filtering any of the plurality of key expressions identified in the message, and to determine a corresponding corrective prompt to the message sender, thereby managing discourse in the virtual community. In one embodiment, after the entire message is deleted and prevented from reaching the intended the recipient, discourse management software application 116 does not inform the message sender that the message was prevented from reaching the intended recipient. Alternatively, discourse management software application 116 may inform the message sender that the message was prevented from reaching the intended recipient, as part of the corrective prompts. Although in the embodiment of FIG. 1, client computers 130a and 130b are represented as personal computers (PCs), in another embodiment one or both of client computers 130a and 130b may comprise a mobile communication device such as a mobile telephone, a digital media player, personal digital assistant (PDA), a wireless computer, or a wireless gaming console, for example.

As shown in FIG. 1, discourse management software application 116 can be accessed through packet network 120. In that instance, discourse management software application 116 may comprise a web application, accessible over a packet network such as the Internet, for example. Alternatively, discourse management software application 116 may reside on a server supporting a local area network (LAN), for instance, or included in another type of limited distribution network. In another embodiment, discourse management software application 116 may reside on a portable computer readable storage medium such as a compact disc read-only memory (CD-ROM), for example. Analogously, in another embodiment forbidden content database 112 and corrective content database 114 may reside on a server supporting a LAN or other limited distribution network.

Figure 2B:
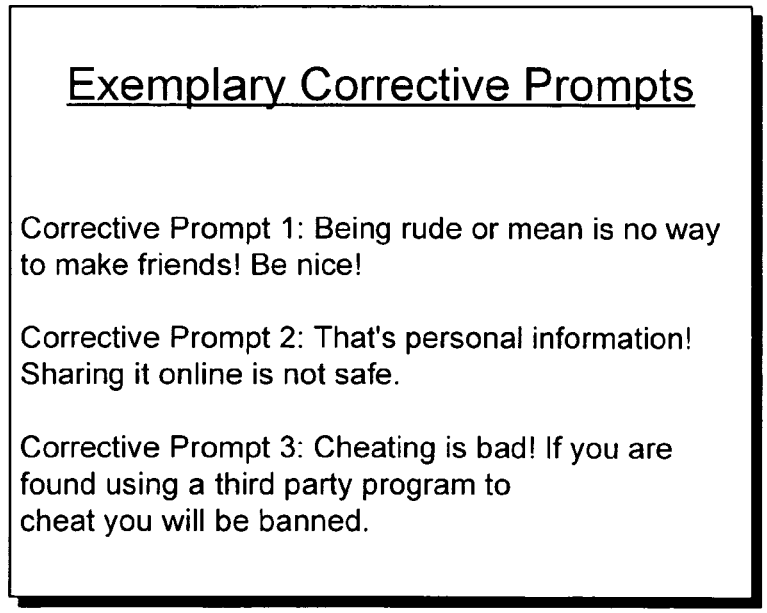
FIG. 2B shows a visual frame of a screen display containing exemplary corrective prompts corresponding to the key expressions contained in FIG. 2A, according to one embodiment of the present invention.

Some embodiments of the present invention will now be further described by reference to FIGS. 2A, 2B, and 3. FIG. 2A shows visual frame 210 corresponding to a screen display of exemplary messages containing key expressions associated with virtual community forbidden communications, according to one embodiment of the present invention, while FIG. 2B shows exemplary visual frame 240 containing exemplary corrective prompts corresponding to the key expressions contained in FIG. 2A. FIG. 3 shows flowchart 300, presenting an exemplary method of managing discourse in a virtual community, capable of producing the displays shown in FIGS. 2A and 2B.

FIG. 2A shows visual frame 210 containing three sample messages comprising forbidden communications. Message 1 is objectionable, and consequently may be forbidden, because it contains an insult. Message 2 may be forbidden because it encourages exchange of personal information that may have undesirable consequences for the user of the virtual community providing the information. Message 3 may be forbidden because it constitutes an invitation to enable illegal or unethical conduct.

Continuing to FIG. 2B, FIG. 2B shows visual frame 240 containing exemplary corrective prompts issued in response to the forbidden communications of FIG. 2A. Corrective prompts 1, 2, and 3, in FIG. 2B, correspond respectively to messages 1, 2, and 3, in FIG. 2A. Corrective prompt 1, issued to the user sending message 1, encourages the user to adopt a more civil tone in future messaging. Corrective prompt 2 is cautionary, warning the user sending message 2 not only that it is inappropriate to request personal information from a recipient user, but also that it is unsafe for the user to provide that type of information to others, as well. Corrective prompt 3 provides instructive content, advising the user that cheating violates virtual community rules, and may result in the user being excluded from future virtual community access if the violation occurs.

Turning now to FIG. 3, FIG. 3 shows flowchart 300 describing the steps, according to one embodiment of the present invention, of managing discourse in a virtual community. Certain details and features have been left out of flowchart 300 that are apparent to a person of ordinary skill in the art. For example, a step may comprise one or more substeps or may involve specialized equipment or materials, as known in the art. While steps 310 through 360 indicated in flowchart 300 are sufficient to describe one embodiment of the present invention, other embodiments of the invention may utilize steps different from those shown in flowchart 300, or may include more, or fewer steps.

Referring to step 310 of flowchart 300, and system 100 in FIG. 1, step 310 comprises receiving a message addressed to one or more recipient users from a virtual community user. Step 310 corresponds, for example, to receipt at virtual community server 110, in FIG. 1, of a message from user 138a addressed to user 138b who, under those circumstances, is the recipient user.

The exemplary method of flowchart 300 continues with step 320, which comprises examining the message for key expressions associated with virtual community forbidden communications. Step 320 may be performed on virtual community server 110, for example, using discourse management software application 116 and referring to a plurality of key expressions stored in forbidden content database 112. Comparison of the content of an examined message with the plurality of key expressions stored in forbidden content database 112 enables discourse management application software 116 to identify key expressions contained in the message.

Looking at the exemplary messages shown in FIG. 2A, key expressions may comprise individual words, such as the work "jerk" in message 1, for example. Key expressions may also comprise a combination of words, not inappropriate in themselves, but constituting forbidden communications when used together. For instance the word combination "phone number," in message 2, may represent such a key expression. While neither the word "phone", nor the word "number" is normally considered objectionable, their combination in a particular order is suggestive that personal information is being sought or provided, so that the specific word combination "phone" followed by "number" may be a key expression associated with virtual community forbidden communications. As another example, the phrase "know how to cheat" in message 3 may constitute a key expression, alerting discourse management software application 116 to the presence of virtual community forbidden communications in message 3.

Flowchart 300 continues with step 330, comprising editing the message to delete the entire message or filter the identified key expressions. Editing the message may occur in one of several ways, or may proceed using a combination of several techniques. In one embodiment, editing may comprise deleting an identified key expression from the message. In another embodiment, editing may comprise deleting an entire sentence or a portion in which at least one key expression is identified. In yet another embodiment, a combination of the previous techniques may be applied depending on criteria such as the number of key expressions identified, and/or their locations within a sentence or message, for example. Alternatively, in some embodiments, identification of one or more key expressions associated with virtual community forbidden content may cause the entire message to be suppressed, preventing delivery of a substantial portion of it to its intended recipient users.

Step 340 of flowchart 300 comprises determining corrective prompts, to be sent to the message sender, corresponding to the one or more key expressions identified during examination of the message in step 320. As shown in FIG. 2B, corrective prompts may comprise instructive content or may contain information regarding rules of discourse in the virtual community. In one embodiment, and where the key expression does not represent intrinsically objectionable subject matter, a corrective prompt may comprise alternatives to the identified key expression for future use by the user. Step 340 may be performed on virtual community server 110, for example, using discourse management software application 116 to determine one or more corrective prompts drawn from a plurality of corrective prompts stored in corrective content database 114. Determination of a corrective prompt may be based on a specific key expression. For example corrective prompt 3 in FIG. 2B may be determined by the presence of the word "cheat" in message 3 of FIG. 2A. Alternatively, determination may occur on the basis of subject matter, such as the word combination "phone number" in message 2 of FIG. 2A giving rise to corrective prompt 2, directed to communication of personal information in general, in FIG. 2B. In addition, determination of a corrective prompt may also be based on a frequency of use of improper language or expression by the user. For example, after a few corrective prompts, the message sender may receive prompts that further use of improper language will not be tolerated or prompts that the accounts can be suspended or terminated.

Moving now to step 350 of flowchart 300, step 350 comprises issuing the corrective prompt to the virtual community user. Referring to FIGS. 1, 2A, and 2B, step 350 can correspond to the appearance on the display of computer 130a of one or more of exemplary corrective prompts 1, 2, and 3, shown in FIG. 2B, or audio prompts, in response to identification of the described key expressions present in respective exemplary messages 1, 2, and 3, in FIG. 2A. As described in conjunction with step 330, in some embodiments, identification of one or more key expressions in a message may cause the message to be suppressed entirely, in which cases the recipient users may not be sent the communication, while the user sending the suppressed message would be issued a corrective prompt, in step 350. However, in those embodiments in which editing step 330 corresponds to deletion of key expressions or sentences containing key expressions, and not the entire message, for example, the filtered message may be sent to the recipient user in optional step 360.

Thus, the present application discloses a method and system for managing discourse in a virtual community. By examining a message received at a virtual community server to identify one or more of a plurality of key expressions associated with forbidden content, various embodiments of the present invention enables control over the type of discourse occurring in the virtual community. By deleting the entire message, or editing the message to filter the identified key expressions, the disclosed embodiments of the present invention protect recipient users from exposure to forbidden communications. By further issuing one or more corrective prompts to the user sending the message, embodiments of the present invention promote positive social interaction, and serve to elevate the level of discourse in the virtual community.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of managing discourse in a virtual community, the method comprising:
    receiving a message from a virtual community user, the message being addressed to one or more recipient users of the virtual community;
    examining the message to identify any of a plurality of key expressions stored in a forbidden content database associated with virtual community forbidden communications;
    editing the message in response to identifying a forbidden key expression of the plurality of key expressions;
    determining a corrective prompt drawn from a plurality of corrective prompts stored in a corrective content database based on the forbidden key expression, wherein the corrective prompt comprises one or more allowed alternative word expressions to the forbidden key expression for future use by the virtual community user in place of the forbidden key expression, and wherein other corrective prompts of the plurality of corrective prompts stored in the corrective content database correspond to other forbidden key expressions stored in the forbidden content database; and
    issuing the corrective prompt to the virtual community user for managing discourse in the virtual community.

2. The method of claim 1, wherein the plurality of key expressions comprise individual words.

3. The method of claim 1, wherein the plurality of key expressions comprise word combinations.

4. The method of claim 1, wherein the plurality of key expressions comprise phrases.

5. The method of claim 1, wherein the editing step comprises deleting the identified key expression from the message to generate an edited message.

6. The method of claim 5, further comprising sending the edited message to the one or more recipient users.

7. The method of claim 1, wherein the editing step comprises deleting the message in its entirety.

8. A system for managing discourse in a virtual community, the system comprising:

a virtual community server;

a forbidden content database stored on the virtual community server, the forbidden content database including a plurality of key expressions associated with virtual community forbidden communications;

a corrective content database stored on the virtual community server, the corrective content database including a plurality of corrective prompts; and a discourse management software application stored on a storage medium of the virtual community server and configured to:

examine a message, received from a virtual community user being addressed to one or more recipient users of the virtual community, to identify any of a plurality of key expressions stored in the forbidden content database;

edit the message in response to identifying a forbidden key expression of the plurality of key expressions;

determine a corrective prompt drawn from a plurality of corrective prompts stored in a corrective content database based on the forbidden key expression, wherein the plurality of corrective prompts comprise one or more allowed alternative word expressions to the forbidden key expression for future use by the virtual community user in place of the forbidden key expression, and wherein other corrective prompts of the plurality of corrective prompts stored in the corrective content database correspond to other forbidden key expressions stored in the forbidden content database; and issue the corrective prompt to the virtual community user for managing discourse in the virtual community.

9. The system of claim 8, wherein the plurality of key expressions comprise individual words.

10. The system of claim 8, wherein the plurality of key expressions comprise word combinations.

11. The system of claim 8, wherein the plurality of key expressions comprise phrases.

12. The system of claim 8, wherein the discourse management software is configured to edit the message received from the virtual community user by deleting an identified key expression from the message to generate an edited message.

13. The system of claim 12, wherein the discourse management software is configured to send the edited message to the one or more recipient users.

14. The system of claim 8, wherein the discourse management software is configured to delete the message in its entirety.

* * * * *